(12) United States Patent
Harris (10) Patent No.: US 6,601,151 B1
(45) Date of Patent: Jul. 29, 2003

(54) APPARATUS AND METHOD FOR HANDLING MEMORY ACCESS REQUESTS IN A DATA PROCESSING SYSTEM

(75) Inventor: Jeremy G Harris, Bucks (GB)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/246,614

(22) Filed: Feb. 8, 1999

(51) Int. Cl.[7] .......................... G06F 13/16; G06F 13/18
(52) U.S. Cl. ........................ 711/158; 710/140
(58) Field of Search ...................... 711/140, 151, 711/167, 169, 118, 154, 158, 150; 710/40, 6; 712/205, 214

(56) References Cited

U.S. PATENT DOCUMENTS

| | | | | |
|---|---|---|---|---|
| 5,638,534 A | * | 6/1997 | Mote, Jr. ..................... | 711/158 |
| 5,673,415 A | * | 9/1997 | Nguyen et al. .............. | 711/151 |
| 5,826,109 A | * | 10/1998 | Abramson et al. .......... | 711/151 |
| 5,848,226 A | * | 12/1998 | Chen et al. .................. | 358/1.15 |
| 5,983,325 A | * | 11/1999 | Lewchuk ..................... | 711/154 |
| 5,983,326 A | * | 11/1999 | Hagersten et al. .......... | 711/152 |
| 6,023,745 A | * | 2/2000 | Lu ............................... | 711/169 |
| 6,052,772 A | * | 4/2000 | Kark et al. ................... | 711/151 |
| 6,058,461 A | * | 5/2000 | Lewchuk et al. ............ | 711/158 |
| 6,112,265 A | * | 8/2000 | Harriman et al. ........... | 711/158 |
| 6,134,634 A | * | 10/2000 | Marshall, Jr. et al. ....... | 711/143 |

* cited by examiner

Primary Examiner—Matthew Kim
Assistant Examiner—Yamir Encarnacion
(74) Attorney, Agent, or Firm—Meyertons Hood Kivlin Kowert & Goetzel, P.C.; B. Noël Kivlin (57) ABSTRACT

A memory access request handling unit is arranged between a source of memory access requests and a data storage element that is the target of the memory access requests. The memory access request handling unit comprises a queue made up of a number of queue elements, each being capable of temporarily storing one memory access request. Comparison logic is arranged to monitor a window of the queue and to select one or more of the queue elements, representing memory access requests not yet transmitted to the data storage element, for transmission to the data storage element. The selection is made on the basis of a comparison between the memory access requests held in the queue and one or both of a priority value set for each memory access request and a list of memory access requests that are currently pending at the data storage element, the list being maintained in a list store of the memory access request handling unit. Examples of the data storage element and source are a processor and cache combination, two cache memories at different levels of a system hierarchy, and a processor unit (with or without cache) and a main memory unit.

23 Claims, 6 Drawing Sheets

APPARATUS AND METHOD FOR HANDLING MEMORY ACCESS REQUESTS IN A DATA PROCESSING SYSTEM

BACKGROUND OF THE INVENTION

The present invention relates to an apparatus and method for handling memory access requests in a data processing system.

In data processing systems of simple architecture a processor is connected to a main memory through a bus. A simple architecture of this kind has severe performance limitations because of memory latency and memory bandwidth. Because of this, most modern data processing systems have a multi-level memory hierarchy. At the top of the memory hierarchy, directly below the processor, there is provided a fast and small memory element, referred to as a cache memory. There then follows main memory and mass storage. Moreover, two or more levels of cache memory may be provided, for example an internal cache memory located on the same integrated circuit as the processor and an external cache memory located on a separate integrated circuit from the processor.

A typical modern data processing system thus has a multi-level memory hierarchy, with the higher levels of memory being associated with faster access times, i.e. lower latency, and the lower levels with slower access times, i.e. higher latency. However, between each level of the memory hierarchy there still remains a latency differential, and the overall latency difference between the processor, on the one hand, and the main memory or mass storage, on the other hand, still exists, notwithstanding the multi-level memory hierarchy.

Although increasing the memory access times of memories at each level of the memory hierarchy will certainly increase system performance, it is likely that an inherent latency differential between the processor and the memory hierarchy levels will remain a feature of future data processing systems, not only for technical, but also for economic, reasons.

The present invention is thus directed to increasing the efficiency with which memory access requests are handled by a data processing system by means other than speeding up memory access times or increasing memory bandwidth.

More especially, it is an aim of the present invention to provide a method and apparatus for increasing the throughput of memory access requests in a data processing system, independent of memory access times and memory bandwidth.

SUMMARY OF THE INVENTION

Particular and preferred aspects of the invention are set out in the accompanying independent and dependent claims. Features of the dependent claims may be combined with those of the independent claims as appropriate and in combinations other than those explicitly set out in the claims.

According to a first aspect of the invention there is provided a memory access request handling unit designed to intercept and re-order the flow of memory access requests output from a source of memory access requests prior to receipt by a target data storage element. Examples of common memory access requests are read requests and write requests. The memory access request handling unit comprises an input for receiving memory access requests and an output for transmitting memory access requests. A queue comprising a plurality of queue elements is arranged to receive, and to store temporarily, memory access requests received at the input pending transmission to the output. Comparison logic is provided that is operable to perform a comparison operation on the memory access requests stored in the queue elements. The result of the comparison operation is to select at least one of the memory access requests for transmission from the queue to the output. In this way, the comparison logic dynamically re-orders the sequence with which memory access requests are supplied to the data storage element.

A memory access request handling unit may be arranged between any two levels in a multi-level system hierarchy. For example, it may be arranged, between a processor and cache memory, between two cache memories at different levels of a memory hierarchy, or between a main memory and a mass storage medium. The mass storage medium may be a CD-ROM, or other mass storage medium such as a hard disk.

In an embodiment of the first aspect of the invention, the memory access request handling unit further comprises a list store comprising a plurality of list elements. Each list element is arranged to store a list entry derived from a memory access request that has previously been transmitted from the queue to the output for as long as that memory access request is being serviced at the data storage element. The comparison logic is arranged to compare ones of the memory access requests stored in the queue elements and the list entries stored in the list store, so as to dynamically select the order in which memory access requests are transmitted from the queue to the output. In this way, the transmission of a memory access request to the data storage element can be suppressed if there is an earlier memory access request still being serviced by the data storage element of the kind which would prevent the servicing of the later memory access request. Conversely, a memory access request stored in the queue can be promoted ahead of other memory access requests stored in the queue, if it can be serviced more rapidly than normal as a result of there being a memory access request currently being serviced by the data storage element of a similar or complementary kind.

In this embodiment, when a memory access request is transmitted from the queue to the output for the data storage element, a list entry is generated. The list entry may include a memory access request-type portion derived from an address portion of the queue element being transmitted. The list entry may also include an identifier portion by which the list entry can be identified on completion of the memory access request and thereby canceled when the data storage element has serviced the memory access request. The comparison logic may be arranged to prevent transmission of any memory access request from the queue to the data storage element which has an address portion that matches the memory access request-type portion of any one of the list entries. Moreover, the comparison logic may be operable preferentially to transmit memory access requests from the queue to the data storage element which have address portions that do not match the memory access request-type portions of any of the list entries.

Taking the example of a cache memory being the data storage element, a memory access request to the same cache line as the previous memory access request can be prevented in the event that the previous memory access request resulted in a cache miss, whereas a memory access request to a different cache line may hit and may thus be allowed to transmit from the queue to the data storage element by the comparison logic.

Taking another example of a main memory being the data storage element, the comparison logic can be arranged to prevent memory access requests being transmitted to any memory bank which is still servicing a previous data request.

In an alternative embodiment of the first aspect of the invention, the queue elements each have a source priority level storage portion arranged to receive a priority value when a memory access request is received at the input. The comparison logic is arranged to compare at least the source priority values of the memory access requests stored in the queue elements, so as to dynamically select the order in which memory access requests are transmitted from the queue to the output. In this way, it is possible to cause a later-generated memory access to reach the data storage element before earlier-generated memory access requests so that memory access requests with a higher priority can be serviced more quickly. The priority value can be determined by an input stage of the memory access request handling unit from attributes of the memory access request using a standard source. Alternatively, the priority value can be explicitly specified in each memory access request by the source, which will need to be specially designed to have this capability.

In a further embodiment of the first aspect of the invention, the features of the above-described embodiments are combined so that the comparison logic is arranged to compare the source priority values of the memory access requests stored in the queue elements with the list entries, so as to dynamically select the order in which memory access requests are transmitted from the queue to the output. Parts of the memory access requests other than the source priority value may also be included in the comparison.

In each of the above-described embodiments additional circuitry associated with the queue and comparison logic, and list if provided, can be interposed in the communication link from the source to the data storage element without having to modify the design of existing memory access request sources and data storage elements. However, in those embodiments that use a source priority value, a modified source is needed in the case that the source priority value is defined at the source. Conversely, a standard source can be used in the case that the source priority value is determined by an input stage of the memory access request handling unit from attributes of a standard format memory access request.

According to a second aspect of the invention there is provided a data processing system including a source of memory access requests, a data storage element for servicing memory access requests generated by the source, and, arranged between the source and data storage element, a memory access request handling unit according to the above-described first aspect of the invention. In use, the memory access request handling unit intercepts and queues memory access requests transmitted from the source and dynamically re-orders the sequence in which they are transmitted to the data storage element, so as to increase overall system performance.

According to third and fourth aspects of the invention, a memory access request handling unit with multiple queues is provided. Moreover, the memory access request handling unit is provided with a router as an input stage. The router is arranged to route the memory access requests received from the source to an appropriate queue. The routing is performed according to a memory access request type classification. The type classification may be made by the router itself on the basis of an analysis of each memory access request. Alternatively, the memory access requests may each contain an explicit type classification added by the source.

The memory access request handling unit of the third aspect of the invention further comprises a list store. The list store has a plurality of list elements. Each list element is arranged to store a list entry derived from a memory access request that has previously been transmitted from one of the queues to the output. Comparison logic is provided and is operable to perform a comparison operation on the memory access requests stored in the queue elements with each of the list entries stored in the list store. As a result of the comparison operation, a selection of at least one or more of the memory access requests is made. The selected memory access request or requests are then transmitted to the output. The provision of multiple queues is exploited by giving a different overall priority level to transmission from the different queues, the different overall queue priority levels being reflected in the comparison operation.

The fourth aspect of the invention provides a memory access request handling unit specifically for memory read requests. Multiple read queues are provided together with comparison logic operable to perform a comparison operation on the memory read requests stored in the queue elements. As a result of the comparison operation, at least one of said memory read requests is selected for transmission to the output. As in the third aspect of the invention the comparison logic additionally prioritizes the selection on a queue-by-queue basis.

As described above, the memory access request handling units according to some embodiments and aspects of the invention require the incoming memory access requests to be tagged with a source priority value.

Accordingly, a fifth aspect of the invention provide a source with this capability. The memory access request source of the fifth aspect of the invention comprises at least first and second memory access request generating units. The source is operable to tag different priority values to memory access requests generated by the respective memory access request generating units. These priority values serve to provide a basis for memory access request type classification by a subsequent memory access request handling unit.

A sixth aspect of the invention provides a method of handling memory access requests in a data processing system that includes a source of memory access requests and a data storage element. Memory access requests transmitted by the source are temporarily held in a queue prior to transmission to the data storage element. Transmission of memory access requests from the queue to the data storage element is made on the basis of a logical comparison of memory access requests stored in elements of the queue. The logical comparison has as an operand a source priority level included as part of each memory access request stored in the queue, and/or a probability of the data storage element currently being able to service the memory access request if transmitted from the queue to the data storage element at that time.

BRIEF DESCRIPTION OF THE DRAWINGS

For a better understanding of the invention and to show how the same may be carried into effect reference is made by way of example to the accompanying drawings in which.

DETAILED DESCRIPTION

Figure 1:
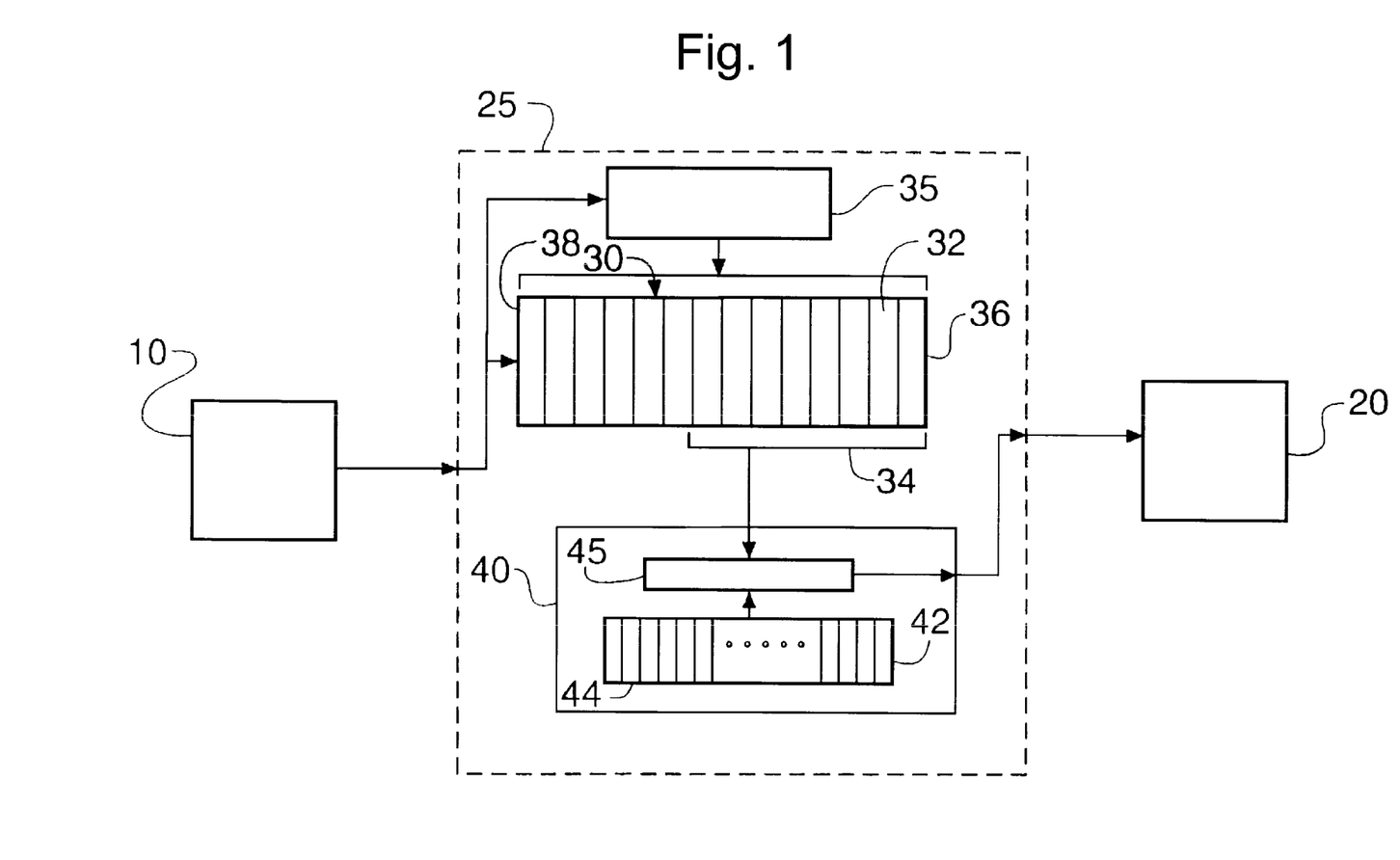
FIG. 1 is a schematic block diagram of a first embodiment of the invention.

FIG. 1 shows schematically a memory access request source 10 and a target for the memory access requests in the form of a data storage element 20. The source 10 and data storage element 20 may be of conventional design. Interposed between the source 10 and data storage element 20 is a memory access request handling unit (RHU) 25. As described in more detail in the following, the function of the memory access request handling unit 25 is to queue and re-order the flow of memory access requests between the source of the memory access requests and the target data storage element. Re-ordering is performed on the basis of either a source priority level, and/or the likelihood that any given memory access request can be worked upon efficiently in the data storage element at the time. In FIG. 1, and subsequent Figures, the arrow-headed lines indicate lines of control.

The memory access request handling unit 25 comprises a queue 30, a transmission unit 40 and a rescind unit 35. The queue 30 has a head end 36 and a tail end 38 and is made up of a plurality of elements 32 arranged between the queue ends 36 and 38. Each queue element 32 is capable of temporarily storing one memory access request. The transmission unit 40 comprises comparison logic 45 and a list store 42 for maintaining an entry for each access already transmitted to the data storage element 20 but not yet complete. The list store 42 comprises a plurality of elements 44 capable of storing a list entry. A list entry is defined as a datum stored in a list element 44 which relates to a memory access request which has been transmitted to the data storage element but which is not yet complete.

The transmission unit 40 is arranged to monitor a window 34 of the queue. The window 34 may extend to cover all the queue elements 32 from the head end 36 to the tail end 38, or may only extend over a portion of the queue between the element at the head end 36 and an intermediate one of the queue elements 32 lying between the queue ends 36 and 38 (as illustrated in FIG. 1). The comparison logic 45 is arranged to select one or more of the queue elements 32 representing memory access requests not yet transmitted to the data storage element 20 for transmission. The selection is made on the basis of a comparison of the memory access requests held in the queue 30 with the memory access requests still pending at the data storage element 20, wherein the logic of the comparison is designed using knowledge of the system design, most especially the data storage element design.

For example, various aspects of the cache memory and main memory design may be reflected in the comparison logic as now described.

First, the comparison logic 45 can be arranged to prevent transmission of a memory access request to a cache memory when a previous access has resulted in a cache miss. Transmission is prevented on the basis of the pending list entry for a main memory access which will have followed from the cache miss. For example, transmission can be prevented if there is a list entry having the same cache line selector bits as the memory access request being considered for transmission.

Further, if there is a pending access to a page of memory, then the page is said to be open, in which case it requires fewer clock cycles than normal to perform a further memory access request to that page. Here it is noted that a main memory is assumed to comprise a number of individual chips (say 1 MB RAM chips) each containing a number of pages of memory (say 256). The comparison logic 45 may thus be arranged to select all memory access requests to one page of memory in direct sequence. The selection can be made on the basis of the address bits 52, since all addresses of a given page will share a common address bit portion.

Another example is to prevent or inhibit transmission of a memory access request to a given bank of main memory when there is at least one list entry indicating that there is already a pending memory access request to that memory bank. Here it is noted that the individual memory chips are assumed to be grouped into memory banks (say 64 1 MB chips per bank to form 64 MB memory banks). Although the memory banks may have buffers and thus may be able to accept further access requests when busy, if a bank is busy it may still be preferable to transmit a memory access request to a different memory bank that is not busy, or at least to a memory bank with fewer pending memory access requests.

A further example is to configure the comparison logic 45 to take account of memory bank dead time. Dead time is time spent by a memory bank on internal operations. The occurrence and duration of dead time may be predictable with knowledge of the memory bank design. For example, a dead time of a certain average, or minimum, duration may always follow from a write request. For read requests, a different dead time may be characteristic. Consequently, the erase mechanism for list entries may include a delay line sensitive to the memory access request-type portion 63. In this way, transmission of a memory access request can be prevented or discouraged during relevant dead time in a manner that avoids having to implement a control loop between the data storage element and the memory access request handling unit 25.

The rescind unit 35 provides a mechanism for canceling entries from the queue 30 under instruction from the source 10. This may be useful when the result of a previously transmitted memory access request has not yet been received by the source and is no longer required by the source. The rescind command specifies a request label by which the queue entry, if not already transmitted to the data storage element 20, can be identified and deleted from the queue. Inclusion of a rescind mechanism can thus further improve the efficiency of communication between the source and data storage element by preventing memory access requests that have become unnecessary from reaching the data storage element. This may be of particular advantage in a multi-thread or pipeline processor where a significant proportion of memory access requests may be generated speculatively, by processors and cache memories at various levels.

An alternative way of implementing a rescind mechanism without a separate rescind unit would be to reserve a rescind command identifiable as such by the comparison logic. For example, the rescind command could be identifiable by a special bit pattern for the address bits 52 and/or data bits 56. The rescind command would also include a label for the memory access request to be rescinded, for example in the form of bits of the control bits 54. Moreover, the rescind command would be given a high, preferably the highest, priority level by writing an appropriate value to the control bits subset 55 to ensure that it received swift attention from the comparison logic 45. Processing of a rescind command by the comparison logic 45 would then result in deletion of the queue entry occupied by the rescind command and deletion of the queue entry of the memory access request to be rescinded.

It will be understood that a rescind mechanism may be advantageous, but may be omitted in some embodiments.

Figure 2:
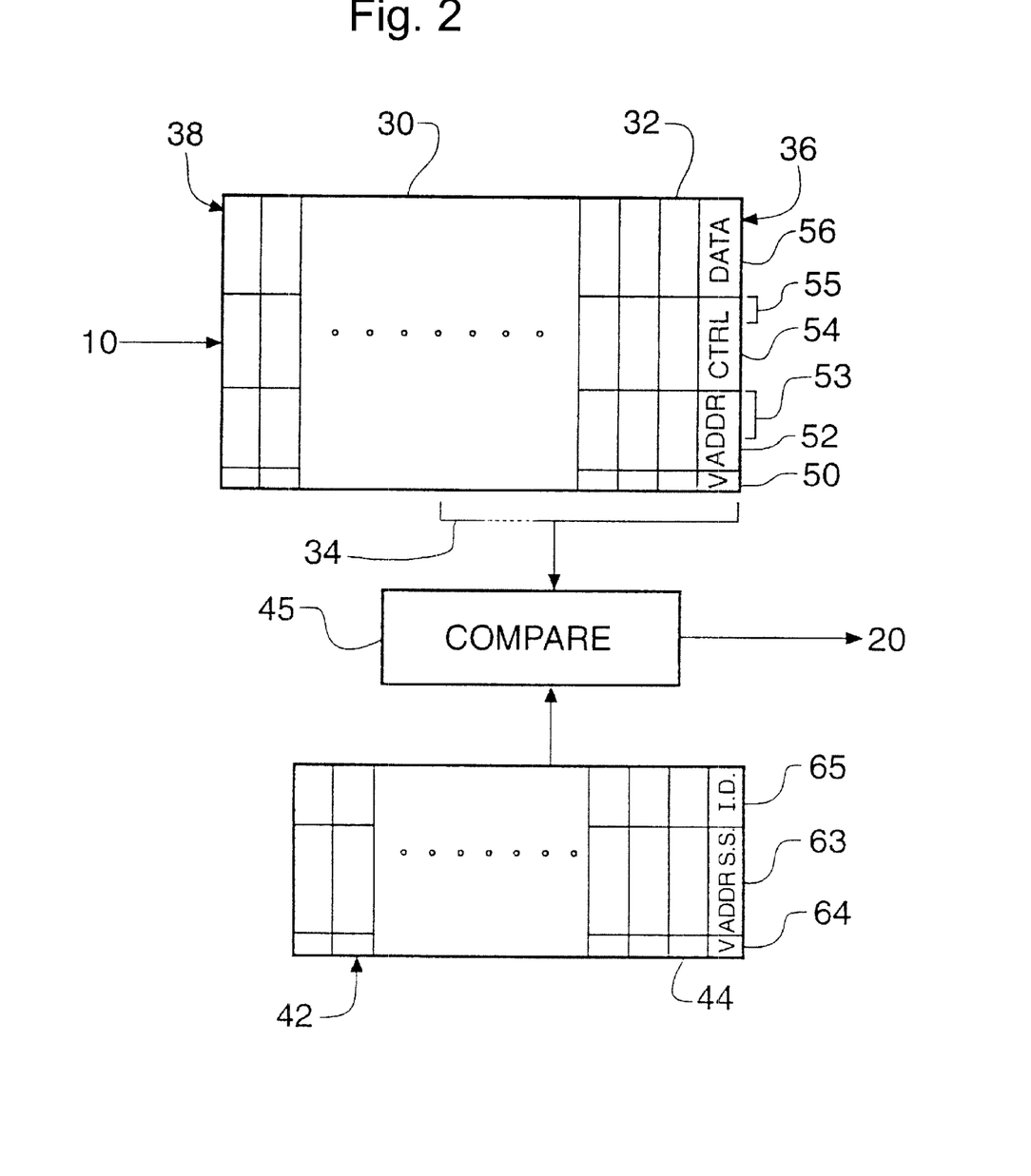
FIG. 2 shows parts of the first embodiment in more detail.

FIG. 2 shows the queue 30, comparison logic 45 and list store 42 in more detail. As shown in FIG. 2, each queue element 32 comprises a valid bit 50 to indicate whether the element contains a memory access request which has not yet been transmitted to the data storage element 20, address bits 52, control bits 54 (including read/write information) and data bits 56.

A subset 53 of the address bits 52 is defined so as to be sufficient to reflect a probability that the data storage element 20 would not be able to handle a similar subsequent memory access request, i.e. a memory access request transmitted when there is an outstanding memory access request having the same value of the address subset bits 53. The probability may be a binary probability (0%/100%) or may have more than two levels.

A subset 55 of the control bits 54 is reserved to convey a source priority value. There may for example be two bits reserved for this purpose to convey a two bit priority value ranging from zero (lowest source priority) to three (highest source priority). The comparison logic 45 is arranged to use the priority value as an operand of its logic.

Source priority levels are set by the source 10 and written to the queue 30. Source level priorities may be used to reflect a variety of source design considerations, several examples of which are now described.

Figure 3:
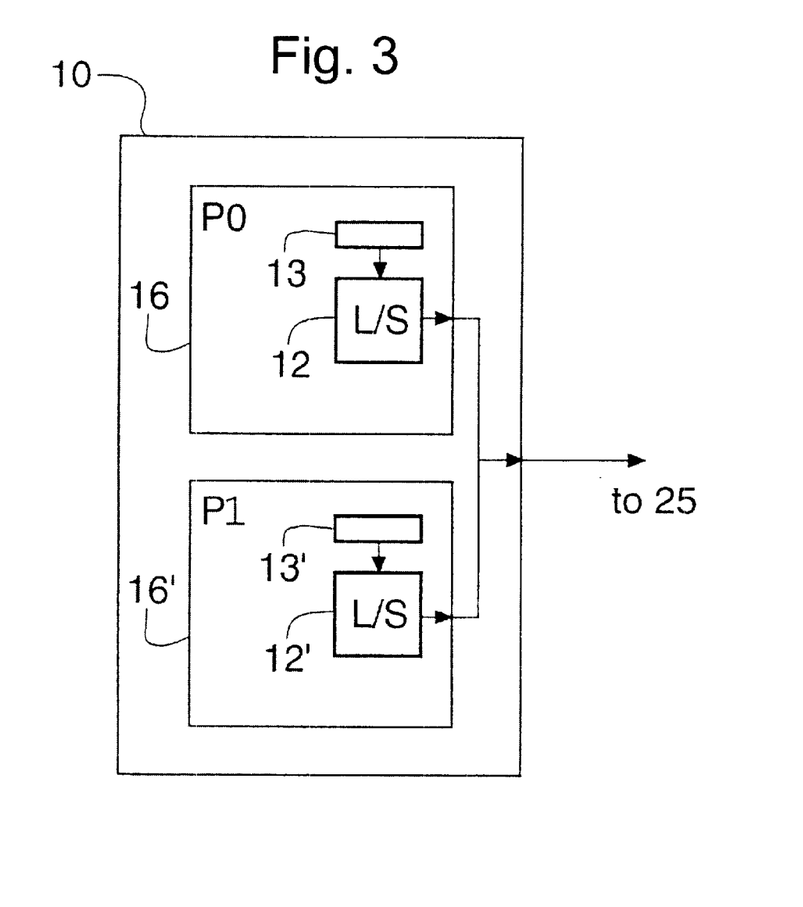
FIG. 3 shows further parts of the first embodiment in more detail.

FIG. 3 shows one example with the source in the form of a multi-processor processor unit 10 including first and second processors 16 and 16', labeled P0 and P1. In use, each processor is a generator of memory read requests. The multi-processor array handles multiple threads of control, with each thread having an internal priority level. A copy of the internal priority level, or another value derived from it, is stored in a memory access request priority register. The first and second processor 16 and 16' have respective access priority registers 13 and 13'. The priority level value stored in the memory access request priority register is then written to the control bits subset 55 of the queue 30. Although a multi-processor source with only two processors has been described, it will be understood that the described example can be extended to any number of processors, for example 4, 16 or more.

Figure 4:
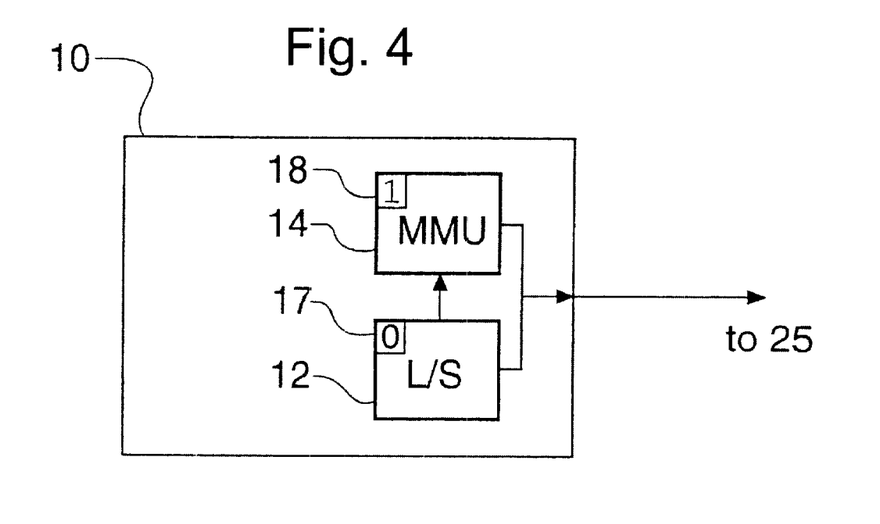
FIG. 4 shows an alternative design for the parts of FIG. 3.

FIG. 4 shows a further example with the source in the form of a processor 10 having two generators of memory read requests, namely a memory management unit (MMU) 14, for translating from virtual to physical addresses, and a load/store unit 12. In this example, processor performance can be enhanced by ascribing MMU table memory read requests a higher source priority level than general memory read requests transmitted from the load/store unit 12. Single bits 17 and 18 are then used for the load/store unit 12 and MMU 14, respectively, to indicate read request priority level. The source priority bit is set to have a value of 1 for all memory read requests transmitted from the MMU 14 and a value of 0 for all memory read requests transmitted from the load/store unit 12. The source priority bit 17 or 18 is written to the queue 30 as the least significant bit of a two bit control bit subset 55. The most significant bit of the subset 55 is set at a value of 0 for memory write requests and 1 for memory read requests. No additional hardware is required in the source for setting the most significant bit, since the memory access request handling unit 25 can distinguish between read and write requests using the read/write control line, or other standard read/write identifier provided by the source. On detection of a write access, both bits of the subset 55 are set to zero to give a three-valued source priority level, with '0,0' indicating a write access, '1,0' indicating a general read request and '1,1' indicating an MMU table read request. The fourth possible value '0,1' is undefined in this example. Alternatively, each of the MMU 14 and load/store unit 12 could generate different priority level values for read write requests directly. A common priority value for write requests from either the MMU 14 or load/store unit 12 could be retained if desired. With this alternative design, the memory access request handling unit is not required to screen incoming memory access requests to distinguish between read and write requests.

Another example (not shown) is a processor that makes use of speculative loads. Loads which are speculative can be ascribed a lower source priority level than normal loads. Moreover, speculative code paths can be given a source priority level which reflects the probability that the "way" of each code path of the branch is the "way" which will ultimately be used in the code execution.

A still further example (not shown) is for pre-fetches into a cache memory from main memory which can be ascribed a predefined priority level within the range of priority levels.

Referring back to FIG. 2, the list elements 44 each comprise a valid bit 64, sufficient. I.D. bits 65 to enable identification of the memory access request concerned among the other pending memory access requests, and address subset bits 63 corresponding to the address subset bits 53 of the queue elements 32. The address subset bits 63 serve to define access-type. The queue 30 and transmission unit 40 are arranged so that when a memory access request is transmitted from the queue 30 to the data storage element 20, the subset bits 53 from the queue element 32 supplying the memory access request are written, in modified or unmodified form, to the subset bits 63 of a currently invalid list element 44, i.e. a list element with a reset valid bit 64. This list element 44 is then marked as valid by setting its valid bit 64, thereby defining that list element as a current list entry. The I.D. bits 65 are also defined at this time. A copy of the I.D. bits 65 is transmitted to the data storage element 20 with the memory access request for labeling purposes. The queue element 32 can then be deleted since the memory access request has been transmitted to the data storage element 20 and a new list entry created for it. Deletion of a memory access request from the queue 30 is instigated by resetting the valid bit 50 of the queue element 32 where the memory access request is stored.

The transmission unit 40 is arranged so that, on completion of a memory access request by the data storage element 20, the list element for that access is canceled. This will occur when the data storage element 20 returns a copy of the I.D. bits 65 to the transmission unit on completion of the memory access request. Cancellation is effected by resetting the valid bit 64 of the list element 44 which has been kept open for that memory access request for the duration of its pendancy at the data storage element. The I.D. bits 65 may for example be formed from a subset of the address bits 52 of the queue elements different from the subset 53. Resetting the valid bit 64 of a list entry 44 removes its list entry status, as viewed by the comparison logic 45.

In the case of a completed read request, the data is forwarded directly from the data storage element 20 to the source 10. Read completion may for example be detected by the transmission unit 40 on the basis of snooping bus communication from the data storage element 20 to the source 10.

In the case of a completed write request, the data storage element 20 may not transmit any message on write completion. The transmission unit 40 can then be arranged to cancel list entries relating to memory write requests a specific time after list entry generation. The specific time is pre-defined to approximate to the normal time required for completion of a write access by the data storage element 20. In this case, the I.D. bits include a time portion reflecting, for example, the generation time, the intended lifetime duration, or the planned cancellation time. The I.D. bits thus include a time portion and a label portion.

In a variant, the I.D. bits 65, or at least the label portion bits, are dispensed with. The provision of I.D. bits for labeling becomes unnecessary if the data storage element responds to memory access requests in the order they are transmitted from the queue. In this case, the list elements 44 can be arranged in the list store 42 in order of transmission. The list elements 44 can then be deleted each time access completion data is transmitted by the data storage element 20.

The transmission unit 40 is arranged to select memory access requests for transmission by comparison of the address subset bits 53 of valid elements of the window 34 with the address subset bits 63 of the valid elements of the list store 42. A memory access request with bits 53 which match any of the address subset bits 63 of a valid list element 44 is prevented from being transmitted from the queue 30 to the data storage element 20 by the comparison logic 45. Moreover, the transmission unit 40 may be arranged so that when more than one access of similar priority is available for transmission from the queue 30, that one closest to the head end 36 of the queue is transmitted first. In any given system, the data storage element 20 and source 10 will typically have respective finite maximum numbers of memory access requests which may be outstanding. The number of list elements 44 can thus be chosen accordingly.

The above-described embodiment has been described as including both source-dependent and target-dependent control of the transmission of memory access requests from the memory access request handling unit to the data storage element. However, it will be understood that source-dependent control could be omitted to provide an embodiment in which the transmission of memory access requests from the memory access request handling unit to the data storage element is made purely on the basis of considerations specific to the target data storage element through reference to the list entries of pending memory access requests maintained in the list store. Moreover, it will be understood that the source designs discussed in the text with reference to FIG. 3 and FIG. 4, and following, are specifically for use with memory access request handling units that include an element of source-dependent control and that are designed to expect a source priority value to have been tagged to the memory access requests.

Similarly, it will also be understood that target-dependent control could be omitted to provide an embodiment in which the transmission of memory access requests from the memory access request handling unit to the data storage element is made purely on the basis of source-priority considerations in which case the list store for maintaining a list of pending memory access requests could be dispensed with.

All these embodiments however exploit queuing of the memory access requests to re-order and re-time the sequence in which memory access requests are received by the data storage element, thereby to improve system efficiency.

FIGS. 5 to 8 show different examples to which the above-described and further embodiments of the invention may be applied.

Figure 5:
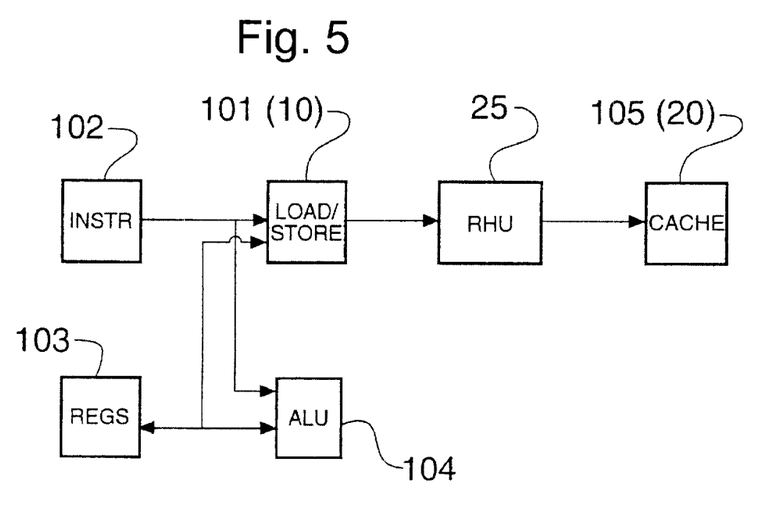
FIG. 5 shows a first example of the invention.

FIG. 5 shows a processor including registers 103, an arithmetic logic unit (ALU) 104, an instruction unit 102 and a load/store unit 101, these elements having conventional interconnection and otherwise being of conventional design. The load store unit 101 forms the memory access request source 10. An internal cache 105, connected to receive memory access requests from the load/store unit 101, forms the data storage element 20. The memory access request handling unit 25 is interposed between the cache memory 105 and the load store unit 101 to improve the efficiency of memory access requests to the cache memory 105 by the load/store unit 101 of the processor.

Figure 6:
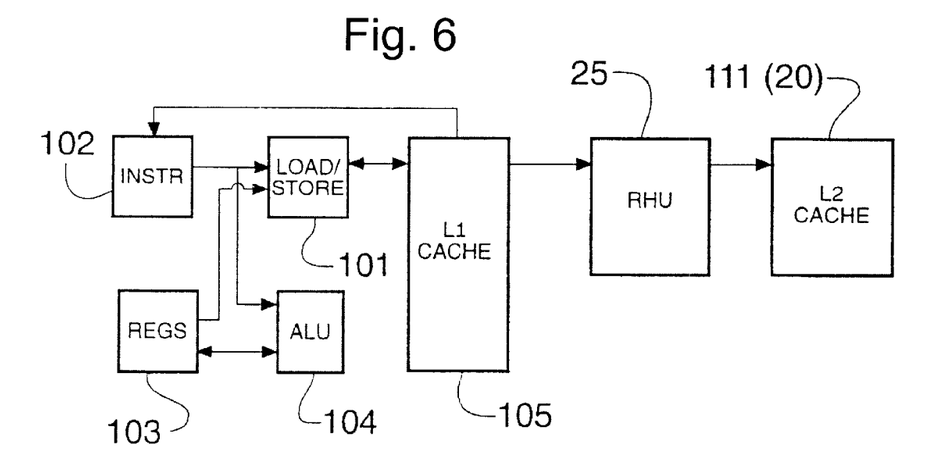
FIG. 6 shows a second example of the invention.

FIG. 6 shows a further example of an embodiment of the invention in which the source 10 is formed by a processor 101–105 and the data storage element 20 by an external cache 111. The processor comprises elements 101 through 104 as shown in FIG. 5, and also an internal cache 105. The memory access request handling unit 25 is interposed between the processor 101–105 and the external cache 111, so as to promote efficiency in the transmission of memory access requests from the processor internal cache 105 to the external cache 111.

Figure 7:
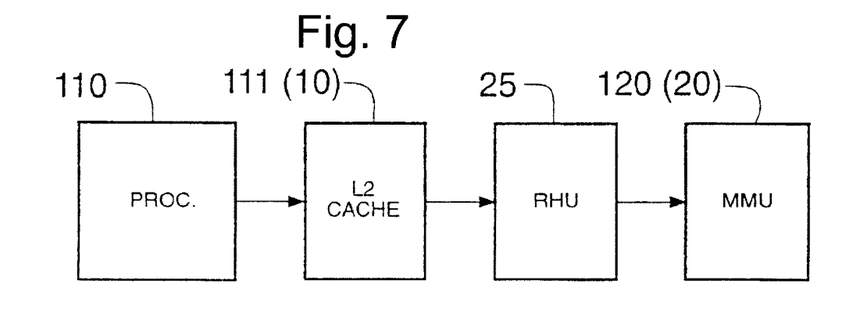
FIG. 7 shows a third example of the invention.

FIG. 7 shows a still further example of an embodiment of the invention in which the memory access request handling unit 25 is interposed between an external cache 111, constituting the source 10, and a main memory unit 120, constituting the data storage element 20. The processor unit 110 may or may not include an internal cache.

Figure 8:
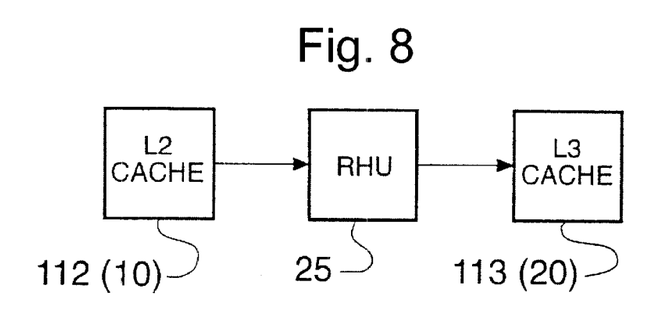
FIG. 8 shows a fourth example of the invention.

FIG. 8 shows yet another example of an embodiment of the invention in which the memory access request handling unit 25 is interposed between a cache memory 112 at one level L2 of a memory hierarchy and a further cache 113 at the next higher level L3 of the memory hierarchy. In this example, the cache memories 112 and 113 respectively form the source and data storage element 10 and 20.

Figure 9:
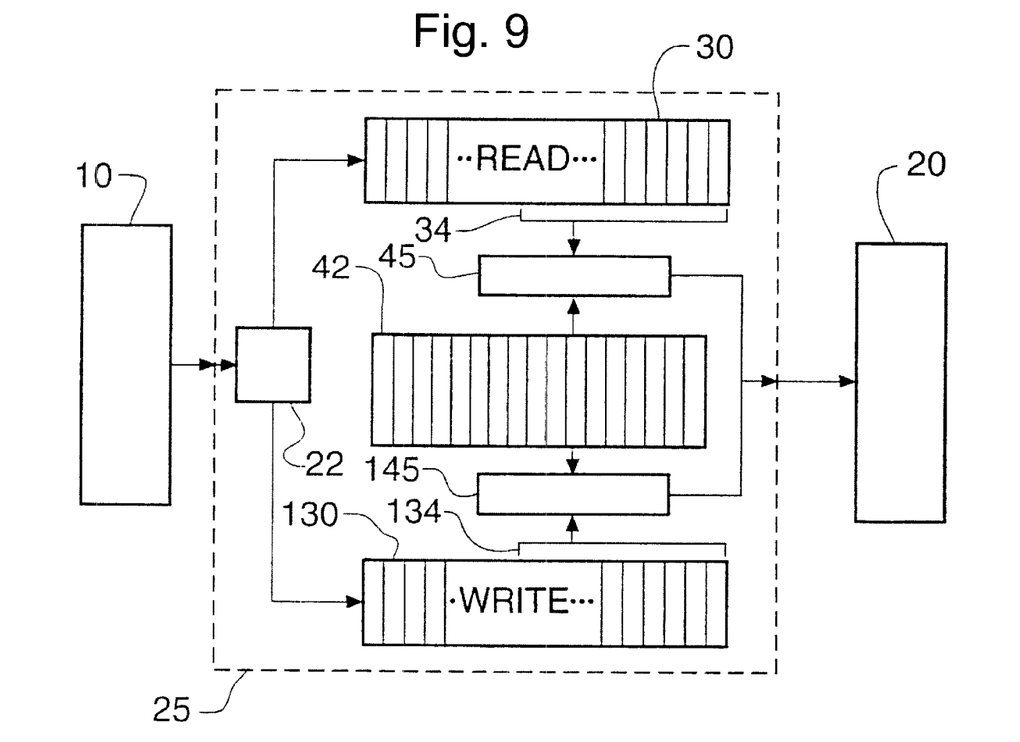
FIG. 9 is a schematic block diagram of a second embodiment of the invention.

FIG. 9 shows a second embodiment of the invention in which the memory access request handling unit 25 has two separate queues 30 and 130, namely a read queue 30 and a write queue 130. A router 22 is provided on the source side of the memory access request handling unit 25 as an input stage, and is arranged to route incoming memory access requests according to access type either to the read queue 30 or to the write queue 130. The routing can be performed using the read/write control line, or other standard read/write identifier provided by the source 10. For example, all memory read requests can be transmitted by the source with the data bits set to a default value. The read queue has a window 34 and a write queue has a window 134. The windows 34 and 134 may generally be of different size. The transmission unit 40 has separate blocks of comparison logic 45 and 145 for the read and write queues 30 and 130 respectively. Each comparison logic block is arranged to compare queue elements from its queue with entries in a list store 42 which is shown as a unitary list relating to both read and memory write requests current at the data storage element 20. It will however be understood that separate lists may be maintained for read and memory write requests, wherein the respective comparison logic blocks 45 and 145 are arranged only to compare queue elements from the relevant queue with list elements in the relevant list. By providing separate queues and associated logic blocks for reads and writes, the logic blocks 45 and 145 can be tailored specifically to the memory access request type to improve efficiency and simplify the logic structure of each block. Moreover, a general higher transmission priority may be given to read requests than write requests, or vice versa. Typically, however, it will be beneficial to give read requests a higher overall priority in view of the fact that the result of memory read requests is generally more critical to the speed of a process flow.

In the second embodiment, there is thus no explicit source-dependent priority value as described with reference to the first embodiment, but instead source considerations are incorporated by giving a prioritization on the basis of access type, the memory access request type being identified by the router 22 arranged to receive and direct incoming access requests from the source 10. The data storage element-dependent control, however, takes forms similar to those described with reference to the first embodiment.

The second embodiment has been described without reference to a rescind mechanism. It will however be understood that a rescind mechanism may be included, either with a separate rescind unit or units, or by way of a rescind command, as described with reference to the first embodiment. In the case of rescind units, separate rescind units may be provided for each queue, or a single rescind unit for one or more of the queues. For example, a rescind unit may be provided for the or each read queue, but not for the or each write queue.

Figure 10:
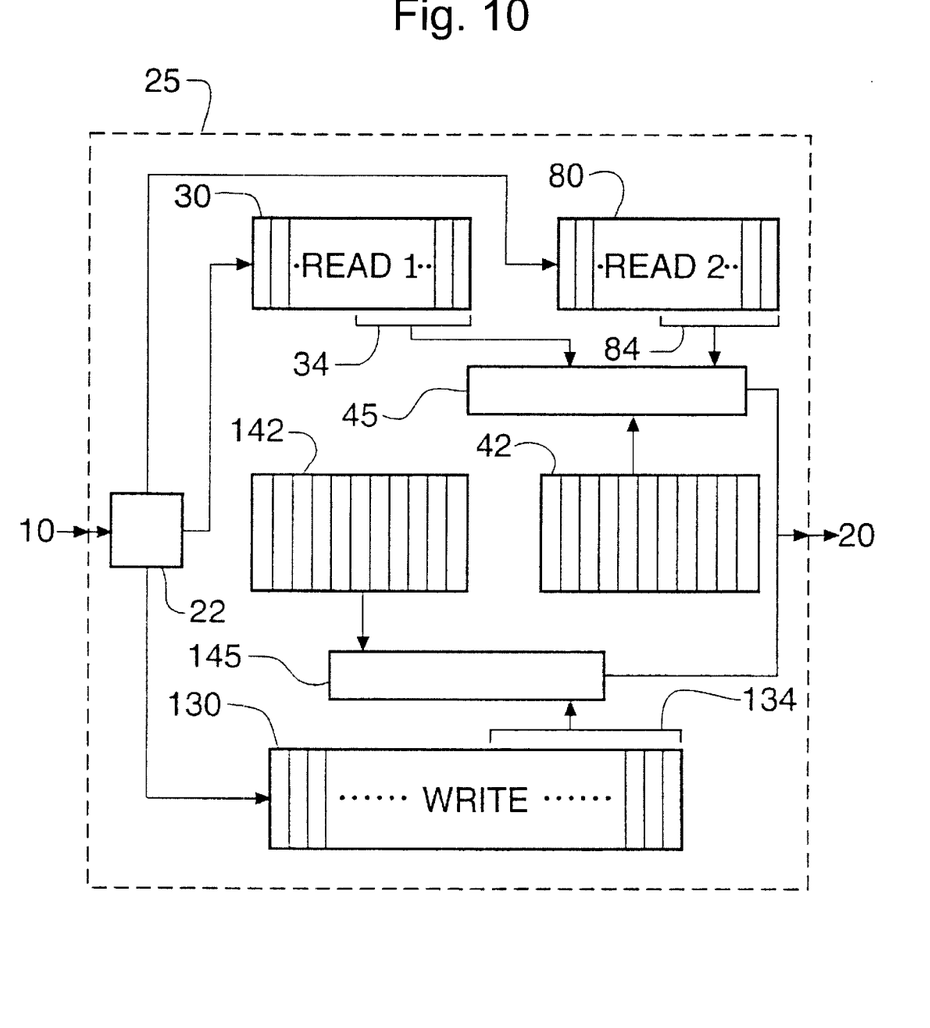
FIG. 10 is a schematic block diagram of a third embodiment of the invention.

FIG. 10 is a schematic block diagram of a memory access request handling unit 25 according to a third embodiment of the invention. The memory access request handling unit 25 is specifically designed for use with a source 10 which tags read access requests with different priority values, such as the sources described above with reference to FIG. 3, FIG. 4 and following text. A router 22 is provided to receive and direct incoming read access requests on the basis of the tagged priority value to one of a plurality of read queues and incoming write access requests to at least one write queue.

In FIG. 10, first and second read queues 30 and 80, and a single write queue 130 are shown. The router 22 is arranged so that the first read queue 30 receives high priority read requests, the second read queue 80 receives low priority read requests and the write queue receives write requests.

If there is only one write queue, as illustrated, read/write routing can be performed on the basis of the read/write control line. In this case, the source need only ascribe priority values for read access requests. On the other hand, if multiple write queues are provided, source priority values can be allotted to write access requests as well as read access requests and the routing performed solely on the basis of the source priority value.

A common comparison logic block 45 is provided for the plural read queues. A list store 42 common to the plural read queues 30 and 80 is provided. The read queues 30 and 80 are connected to the read logic block 45 by respective windows 34 and 84. In this embodiment a separate logic block 145 is provided for the write queue 130 and arranged to monitor a write queue window 134. Moreover, a separate list store 142 is also provided specifically for the write queue 130, so that the pending read and memory write requests are grouped separately in the list stores 42 and 142 respectively.

In the third embodiment, there is thus source-dependent prioritization of access request handling. Target-dependent control of forms similar to those described with reference to the first embodiment may also be provided, but could be omitted.

In a variant of the third embodiment, the router 22 is arranged to detect between read and memory write requests, as in the second embodiment, and to route read requests according to a source priority value. The source 10 then needs only to tag a priority value to read requests.

Moreover, in a further variant of the third embodiment, the memory access request handling unit 25 is designed for use with a read-only data storage element, such as a ROM device. In this case, the source 10 will transmit only memory read requests and the write queue 130 and associated logic block 145 and list store 142 are omitted.

It will be appreciated that although particular embodiments of the invention have been described, many modifications/additions and/or substitutions may be made within the spirit and scope of the present invention.

What is claimed is:

1. A memory access request handling unit for a data processing system that includes a source of memory access requests and a data storage element for servicing memory access requests, the memory access request handling unit comprising:

an input for receiving memory access requests;

an output for transmitting memory access requests;

a queue comprising a plurality of queue elements arranged to receive, and to store temporarily, memory access requests received at the input pending transmission to the output;

a list store comprising a plurality of list elements, each arranged to store a list entry derived from a memory access request that has been transmitted from the queue to the output and not yet completed; and comparison logic operable to perform a comparison operation on at least two of the memory access requests stored in at least two of the plurality of queue elements with the list entries stored in the list store, and to select, as a result of the comparison operation, at least one of the at least two of the memory access requests for transmission from the queue to the output, said comparison operation having an operand based upon a probability associated with each of the at least two memory access requests being able to be currently serviced by the data storage element.

2. A unit according to claim 1, operable so that, when a memory access request is transmitted from the queue to the output, a list entry is generated including a memory access request-type portion derived from an address portion of the memory access request concerned.

3. A unit according to claim 2, operable so that the list entry further includes an identifier portion by which the list entry can be identified and thereby canceled.

4. A unit according to claim 2, wherein the comparison logic is arranged to prevent transmission of any memory access request from the queue to the output which has an address portion that matches the memory access request-type portion of any one of the list entries.

5. A unit according to claim 2, wherein the comparison logic is operable preferentially to transmit memory access requests from the queue to the output which have address portions that do not match the memory access request-type portions of any of the list entries.

6. A unit according to claim 1, wherein the queue elements each have a source priority level storage portion arranged to receive a priority value when a memory access request is received at the input, wherein the comparison operation compares at least the source priority values of the at least two memory access requests stored in the at least two of the plurality of queue elements.

7. A unit according to claim 1, wherein the queue elements each have a source priority level storage portion arranged to receive a priority value when a memory access request is received at the input, wherein the comparison operation compares the source priority values of the at least two memory access requests stored in the at least two of the plurality of queue elements with the list entries.

8. A unit according to claim 1, wherein the queue extends from a head end to a tail end and the comparison logic is connected to the queue across a window of queue elements extending from the head end to an intermediate position between the head end and tail end, so as to allow comparison of memory access requests stored in queue elements positioned within the window and the list entries, the queue being connected to the input so that memory access requests received at the input are preferentially loaded into queue elements towards the head end.

9. A unit according to claim 1, wherein the queue extends from a head to a tail and the comparison logic is connected to the queue across a window of queue elements extending from the queue head to the queue tail, so as to allow comparison between any of the queue elements and the list entries.

10. A unit according to claim 1, wherein the queue elements include portions for storing a memory access request label by which a memory access request in the queue can be located, the unit being responsive to receipt of a rescind command at the input to delete a memory access request specified by its memory access request label.

11. A data processing system including:
a source of memory access requests; and
a data storage element for servicing memory access requests generated by the source;
the system further comprising a memory access request handling unit interposed between the source and the data storage element to intercept memory access requests transmitted from the source to the data storage element, the memory access request handling unit comprising:
an input for receiving memory access requests from the source;
an output for transmitting memory access requests to the data storage element;
a queue comprising a plurality of queue elements, each arranged to receive, and to store temporarily, a memory access request received from the source pending transmission to the data storage element;
a list store comprising a plurality of list elements, each arranged to store a list entry derived from a memory access request that has been transmitted from the queue to the output and not yet completed; and
comparison logic operable to perform a comparison operation on a plurality of the memory access requests stored in a plurality of the queue elements with the list entries stored in the list store, and to transmit, as a result of the comparison operation, at least one of the plurality of the memory access requests from the queue to the data storage element, said comparison operation having an operand based upon a probability associated with the at least one of the plurality of memory access requests being able to be currently serviced by the data storage element.

12. A system according to claim 11, wherein the source is a load/store unit of a processor and the data storage element is an internal cache memory of that processor.

13. A system according to claim 11, wherein the source is a processor and the data storage element is an external cache memory of that processor.

14. A system according to claim 11, wherein the source is a processor unit and the data storage element is a main memory.

15. A system according to claim 14, wherein the processor unit includes a processor and internal cache memory.

16. A system according to claim 11, wherein the source is a first memory and the data storage element is a second memory at a higher level in the system hierarchy.

17. A system according to claim 16, wherein the first and second memories are different level cache memories.

18. A system according to claim 16, wherein the first memory is a cache memory and the second memory is a main memory.

19. A memory access request handling unit for a data processing apparatus that includes a source of memory access requests and a data storage element for servicing memory access requests, the memory access request handling unit comprising:
an input for receiving memory access requests;
an output for transmitting memory access requests;
a plurality of queues each comprising a plurality of queue elements arranged to receive, and to store temporarily, memory access requests received at the input pending transmission to the output;
a router arranged between the input and the queues to route the memory access requests to different ones of the queues according to a memory access request type classification;
a list store comprising a plurality of list elements, each arranged to store a list entry derived from a memory access request that has been transmitted from one of the queues to the output and not yet completed; and
comparison logic operable to perform a comparison operation on at least two of the memory access requests stored in at least two of the plurality of queue elements in each of at least two of the queues with each of the list entries stored in the list store and to select, as a result of the comparison operation, at least one of said at least two of the memory access requests for transmission to the output, wherein the comparison logic additionally prioritizes selection of memory access requests on a queue-by-queue basis, said comparison operation having an operand based upon a probability associated with each of the at least two memory access requests being able to be currently serviced by the data storage element.

20. A source of memory access requests for use with a memory access request handling unit according to claim 19, the source comprising at least first and second memory access request generating units and being operable to tag different priority values to memory access requests generated by the respective memory access request generating units, the priority values serving to provide a basis for the memory access request type classification of each memory access request.

21. A memory read request handling unit for a data processing apparatus that includes a source of memory read requests and a data storage element for servicing memory read requests, the memory read request handling unit comprising:

an input for receiving memory read requests;

an output for transmitting memory read requests;

a plurality of read queues each comprising a plurality of queue elements arranged to receive, and to store temporarily, memory read requests pending transmission to the output;

a router arranged between the input and the read queues so as to route read memory read requests from the input to different ones of the read queues according to a memory read request type classification;

a list store comprising a plurality of list elements, each arranged to store a list entry derived from a memory access request that has been transmitted from one of the plurality of read queues to the output and not yet completed; and comparison logic operable to perform a comparison operation on at least two of the memory read requests stored in at least two of the plurality of queue elements in each of at least two of the read queues with the list entries stored in the list store, and to select, as a result of the comparison operation, at least one of said at least two of the memory read requests for transmission to the output, wherein the comparison logic additionally prioritizes selection of memory read requests on a queue-by-queue basis.

22. A source of memory read requests for use with a memory read request handling unit according to claim 21, the source comprising at least first and second memory read request generating units and being operable to tag different priority values to memory read requests transmitted from the respective memory read request generating units, the priority values serving to provide a basis for memory read request type classification of each memory read request.

23. A method of handling memory access requests in a data processing system that includes a source of memory access requests and a data storage element, wherein memory access requests transmitted by the source are temporarily held in a queue prior to transmission to the data storage element, and memory access requests are passed from the queue to the data storage element on the basis of a logical comparison of a plurality of the memory access requests stored in a plurality of elements of the queue, the logical comparison having as operands a source priority level attached to each of the plurality of the memory access requests and a probability associated with each of the plurality of memory access requests of the data storage element currently being able to service a respective one of the plurality of the memory access requests if transmitted from the queue to the data storage element at that time.

* * * * *